US011748865B2

(12) United States Patent
Scheidegger et al.

(10) Patent No.: US 11,748,865 B2
(45) Date of Patent: Sep. 5, 2023

(54) HIERARCHICAL IMAGE DECOMPOSITION FOR DEFECT DETECTION

(71) Applicant: International Business Machines Corporation, Armonk, NY (US)

(72) Inventors: Florian Michael Scheidegger, Dietlikon (CH); Adelmo Cristiano Innocenza Malossi, Schonenberg (CH)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 17/113,672

(22) Filed: Dec. 7, 2020

(65) Prior Publication Data

US 2022/0180497 A1    Jun. 9, 2022

(51) Int. Cl.
*G06T 7/00* (2017.01)
*G06T 3/40* (2006.01)

(52) U.S. Cl.
CPC ............. *G06T 7/0004* (2013.01); *G06T 3/40* (2013.01); *G06T 2207/20084* (2013.01); *G06T 2207/30108* (2013.01)

(58) Field of Classification Search
CPC ..................... G06T 7/0004; G06T 3/40; G06T 2207/20084; G06T 2207/30108
See application file for complete search history.

(56) References Cited

U.S. PATENT DOCUMENTS

| 11,205,119 | B2 * | 12/2021 | Karlinsky | ............ G06V 10/454 |
| 11,321,873 | B1 * | 5/2022 | Bauer | ..................... G06T 7/521 |
| 2005/0131660 | A1 * | 6/2005 | Yadegar | ................... G06T 9/002 375/240 |
| 2014/0055478 | A1 | 2/2014 | Thakkar | |
| 2016/0034780 | A1 | 2/2016 | Duan | |

(Continued)

FOREIGN PATENT DOCUMENTS

| CN | 109284669 A | 1/2019 |
| CN | 111191714 A | 5/2020 |
| CN | 111401122 A | 7/2020 |

OTHER PUBLICATIONS

"COCO 2019 Object Detection Task", COCO Common Objects in Context, 4 pps., downloaded from the Internet on Nov. 28, 2020, <http://cocodataset.org/#detection-2019>.

(Continued)

*Primary Examiner* — Bobbak Safaipour
(74) *Attorney, Agent, or Firm* — Daniel R. Simek; Jared L. Montanaro

(57) ABSTRACT

Aspects of the present invention disclose a method, computer program product, and system for improving object detection in high-resolution images at inference time. The method includes one or more processors receiving a high-resolution image. The method further includes one or more processors decomposing the received image into hierarchically organized layers of images. Each layer comprises at least one image tile of the received image. Each of the image tiles have a corresponding resolution suitable to a baseline image recognition algorithm. The method further includes one or more processors applying the baseline algorithm to each of the image tiles of each layer. The method further includes one or more processors performing a result aggregation of results of the baseline algorithm applications to the image tiles of the layers.

17 Claims, 7 Drawing Sheets

(56) References Cited

U.S. PATENT DOCUMENTS

| | | |
|---|---|---|
| 2018/0268257 A1 | 9/2018 | Ren |
| 2019/0057507 A1 | 2/2019 | El-Khamy |
| 2019/0073568 A1 | 3/2019 | He |
| 2020/0175352 A1 | 6/2020 | Cha |
| 2020/0286382 A1* | 9/2020 | Avedisov ............ G08G 1/16 |

OTHER PUBLICATIONS

"Detectron (implements Mask R-CNN in Caffe2 among others)", © 2020 GitHub, Inc., 7 pps., <https://github.com/facebookresearch/Detectron>.

"Faster AI vision implementations and higher productivity", 2 pps., IBM, translated from the Internet on Nov. 30, 2020, <https://www.ibm.com/ch-de/marketplace/ibm-visual-insights>.

"Find a product", IBM, downloaded from the Internet on Nov. 28, 2020, 6 pps., <https://www.ibm.com/products/ibm-visual-inspector>.

"IBM Maximo for Civil Infrastructure V7.6.1 helps reduce the cost and improves the monitoring of maintaining civil infrastructure, such as roads, rails, bridges, and tunnels", IBM United States Software Announcement, 220-084, Mar. 10, 2020, 14 pps., <https://www-01.ibm.com/common/ssi/cgi-bin/ssialias?infotype=AN&subtype=CA&htmlfid=897/ENUS220-084&appname=USN>.

"IBM to Develop an AI-Powered IoT Solution to Help Clients Manage and Monitor Aging Bridges, Tunnels, Highways and Railways", Orlando, Fla., Apr. 24, 2019, IBM, 3 pps., <https://newsroom.ibm.com/2019-04-24-ibm-to-Develop-an-AI-Powered-IoT-Solution-to-Help-Clients-Manage-and-Monitor-Aging-Bridges-Tunnels-Highways-and-Railways>.

"IBM Visual Insights—how to create deep learning model", May 26, 2020, IBM, 2 pps., <https://www.youtube.com/watch?v=NPxScGlnHc0>.

"IBM Visual Insights: Accessible AI for Visual Inspection", May 13, 2020, IBM, 2 pps., <https://www.youtube.com/watch?v=3tNEOSoAxsE>.

"Matterport/Mask_RCNN (implements Mask R-CNN in Keras and Tensorflow)", © 2020 GitHub, Inc., 26 pps., <https://github.com/matterport/Mask_RCNN>.

"Pytorch-mask-rcnn (implements Mask R-CNN in PyTorch (reimplementation)", © 2020 GitHub, Inc., 12 pps., <https://github.com/multimodallearning/pytorch-mask-rcnn>.

"Severstal: Steel Defect Detection, Can you detect and classify defects in steel?", Severstal, 2,431 teams, a year ago, kaggle, 2 pps., downloaded from the Internet on Nov. 28, 2020, <https://www.kaggle.com/c/severstal-steel-defect-detection>.

"Welcome to IBM Maximo Visual Inspection", 8 pps., downloaded from the Internet on Nov. 28, 2020, IBM, (screenshots), <https://vision-poc1.aus.stglabs.ibm.com/visual-insights-v120-prod/#/login>.

"What is COCO?", COCO Common Objects in Context, 2 pps., Downloaded from the Internet on Nov. 28, 2020, <http://cocodataset.org/#home>.

Blanco et al., "Artificial intelligence: Construction technology's next frontier", McKinsey & Company, Apr. 4, 2018, 17 pps., <https://www.mckinsey.com/industries/capital-projects-and-infrastructure/our-insights/artificial-intelligence-construction-technologys-next-frontier#>.

Ferguson et al., "Detection and Segmentation of Manufacturing Defects with Convolutional Neural Networks and Transfer Learning", Smart Sustain Manuf Syst. 2018 ; 2: . doi:10.1520/SSMS20180033, 43 pps., <https://www.ncbi.nlm.nih.gov/pmc/articles/PMC6512995/pdf/nihms-1520836.pdf>.

Girshick, "Fast r-cnn", Proceedings of the IEEE international conference on computer vision, 2015, pp. 1440-1448 <http://openaccess.thecvf.com/content_iccv_2015/html/Girshick_Fast_R-CNN_ICCV_2015_paper.html>.

He et al., "Mask R-CNN", Jan. 24, 2018, 12 pps., Facebook AI Research (FAIR), <https://arxiv.org/pdf/1703.06870.pdf>.

Liling et al., "Hierarchical segmentation approach to detection of defects on welding radiographic images", 6 pps., 2009 4th IEEE Conference on Industrial Electronics and Applications, <https://ieeexplore.ieee.org/document/5138570>.

Lv et al., "Deep Metallic Surface Defect Detection: The New Benchmark and Detection Network", Accepted: Mar. 7, 2020; Published: Mar. 11, 2020, 15 pps.,Sensors 2020, 20, 1562; doi:10.3390/s20061562, <https://www.ncbi.nlm.nih.gov/pmc/articles/PMC7146379/>.

Prappacher et al., "Defect Detection on Rolling Element Surface Scans Using Neural Image Segmentation", Applied Sciences, Appl. Sci. 2020, 10, 3290, 13 pps., <https://www.mdpi.com/2076-3417/10/9/3290>.

Reddy, "Automating defect detection using Computer Vision", ZenSar, May 18, 2020, <https://www.zensar.com/blogs/2020/05/automating-defect-detection-using-computer-vision/>.

Zeng et al, "Towards High-Resolution Salient Object Detection", 10 pps., Dalian University of Technology, China and Adobe Research, USA, CVF, downloaded from the Internet on Nov. 28, 2020, <https://openaccess.thecvf.com/content_ICCV_2019/html/Zeng_Towards_High-Resolution_Salient_Object_Detection_ICCV_2019_paper.html>.

"Combined Search and Examination Report under Sections 17 and 18(3)", Reference No. DP/P49977GB, Application No. GB2116711.9, dated May 9, 2022, 6 pgs.

* cited by examiner

HIERARCHICAL IMAGE DECOMPOSITION FOR DEFECT DETECTION

BACKGROUND OF THE INVENTION

The present invention relates generally to the field of object detection, and more particularly to object detection in high-resolution images.

Research organizations and enterprises have made huge efforts in implementing AI (artificial intelligence) driven applications to automate processes, implement more human-friendly user interfaces, or help to analyze large amounts of data. Deep learning approaches have demonstrated outstanding successes and have outperformed classical machine-learning solutions. Two main factors, mainly, the availability of performant computing infrastructure and the availability of large labeled datasets, have driven the success of deep learning techniques. Deep learning approaches are often used for image classification, object detection, video analysis, text translation, and audio genre classification, just to name a few. Especially, most recent and superior models that operate with pixel data may make use of convolutional neural networks. Thereby, deep learning approaches dealing with image data may be separated into three main tasks: a) classification, b) detection, and c) segmentation. All three tasks share a single input, but they define what the approach must produce. For classification, a single class label is predicted (e.g., the image showing a dog), for detection, a bounding box is produced (e.g., the dog is located in the rectangle [X, Y, dX, dY]); and for segmentation, the pixels that belong to the intended object are predicted (e.g., pixels p1, p2, p3, . . . , pN show a dog).

Automated defect detection defines a subset of the general task of object detection, wherein the goal is to identify (detect and/or segment) defects on industrial images. Applications may include use cases from various domains, including the medical domain (e.g., identifying the anatomy of humans from x-ray scans), the material manufacturing industry (e.g., identifying defects on produced steel or other products), or defect detections on civil infrastructure (e.g., bridges or tall buildings).

SUMMARY

Aspects of the present invention disclose a method, computer program product, and system for improving object detection in high-resolution images at inference time. The method includes one or more processors receiving a high-resolution image. The method further includes one or more processors decomposing the received image into hierarchically organized layers of images. Each layer comprises at least one image tile of the received image. Each of the image tiles have a corresponding resolution suitable to a baseline image recognition algorithm. The method further includes one or more processors applying the baseline algorithm to each of the image tiles of each layer. The method further includes one or more processors performing a result aggregation of results of the baseline algorithm applications to the image tiles of the layers.

In another embodiment, performing the result aggregation of results of the baseline algorithm applications to the image tiles of the layers further includes one or more processors aggregating results of the baseline algorithm per layer, one or more processors performing a pairwise layer comparison of results of the baseline algorithm to adjacent pairwise layers, and one or more processors performing a hierarchical aggregation of the baseline algorithm results depending on the pairwise layer comparison.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited. Preferred embodiments of the invention will be described, by way of example only, and with reference to the following drawings.

DETAILED DESCRIPTION

Figure 1:
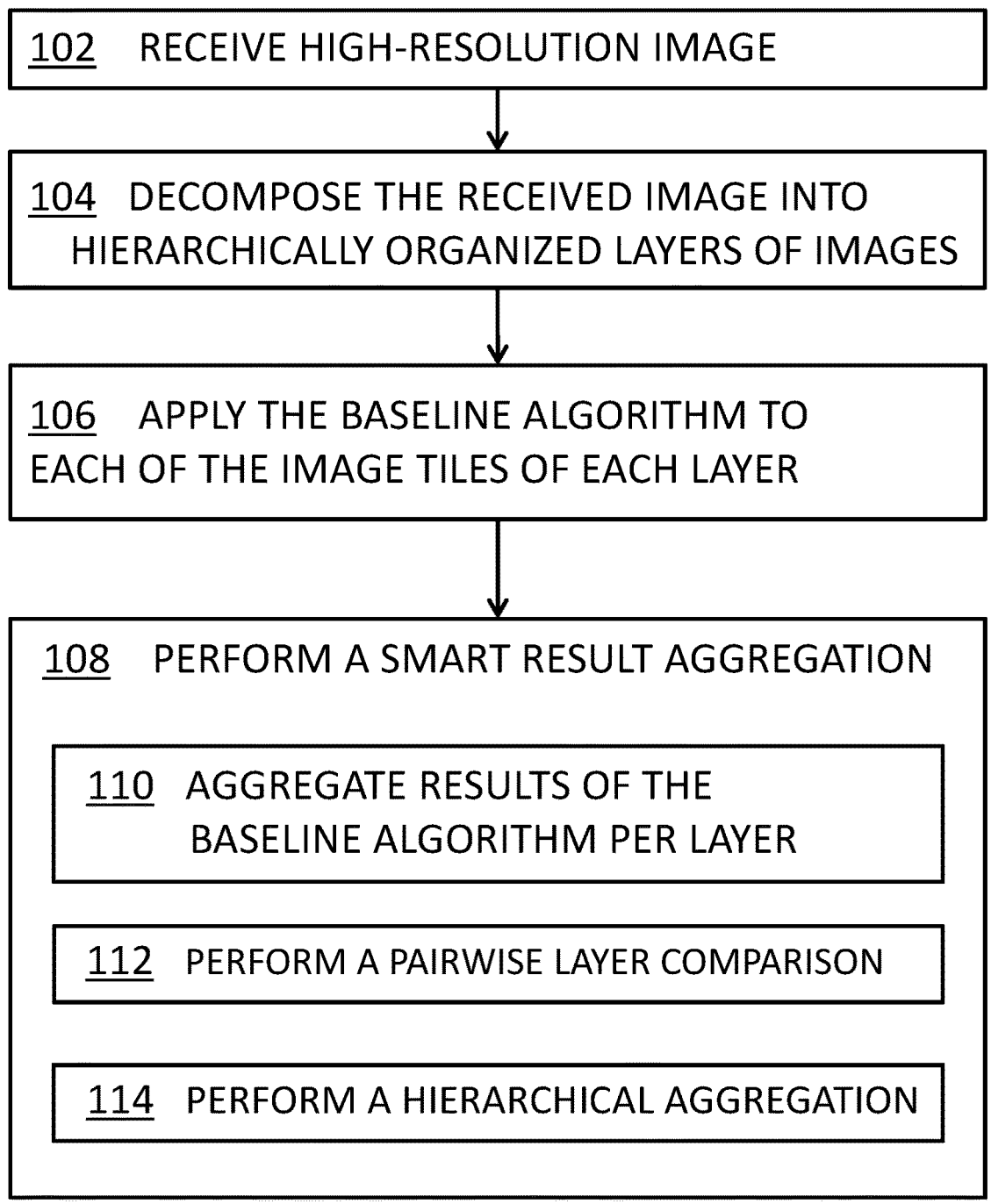
FIG. 1 depicts a block diagram of an embodiment of a method for improving object detection in high-resolution images at inference time, in accordance with an embodiment of the present invention.

Embodiments of the present invention recognize that many of the use cases for object detection define very challenging problem instances, even when using the latest deep learning methodologies. The reasons are manifold and may be explained by light variations including, but not limited to: different light conditions, different image resolutions, different cameras used to capture images (e.g., different lens distortions, the sensitivity of the camera (ISO), etc.), different viewpoints, different zoom levels, occlusions from obstacles (e.g., a tree in front of a pillar of a bridge), and different backgrounds (e.g., the looks different from two bridges), obstacle objects in the background that are not expected (e.g., people, cars, and ships in the proximity of a bridge, where the bridge and its defects are the main subject), among others. Additionally, many defects do not have clear boundaries which make the defects harder to detect as objects.

Further embodiments of the present invention recognize that traditional deep learning methods operate typically on relatively small image size. For example, state-of-the-art image classification algorithms that are evaluated on the CIFAR-10 data set, use inputs that have a shape of 32 times 32 pixels. Furthermore, the widespread image net, that provides different image sizes, most algorithms follow a uniform training and evaluation setup where images are resized to a fixed size of 224 times 224 pixels. Object detection algorithms, such as Mask R-CNN (Region Based Convolutional Neural Network) operate on a fixed scale of 1024 pixels. However, in contrast to that, embodiments of the present invention recognize that high-resolution images are nowadays almost freely available; many cameras support 2K, 4K, and 8K modes, high-end cameras supporting even 16K up to 64K are also available. Capturing images in such a setting results in working with images that have a pixel width that is 2 to 64 times larger than the expected size of the original formulation of the detector.

Embodiments of the present invention recognize that defects are mostly small features that are only located at a few sparse locations in the high-resolution images. Henceforth, simply resizing the images to a smaller resolution is problematic, since that way a substantial factor of resolution is lost. In addition, tiling one high-resolution image into smaller images that are treated separately does help to keep the high resolution. However, tiling comes with additional overhead that is necessary to handle overlapping regions (e.g., partial visible defects on one tile) and it extends the workload of one image to the number of tiles extracted from that image, resulting in a larger workload. Embodiments of the present invention recognize that, as required in deep learning approaches, to get a good generalization behavior of deep learning methods, it is important that training and test images follow the same statistic. Experimenting, with different tiling settings, and ensuring the statistic of one image tile in training matches, the statistic of image tiles in the test scenario is becoming a non-trivial task. Furthermore, embodiments of the present invention recognize that modifications applied in the training domain, which trigger a retraining of the model, are computationally very intensive and thus ineffective and expensive.

Additional embodiments of the present invention recognize that, in order to implement a first development cycle, typically known object recognition algorithms are reused again and again. The algorithms typically rely on a fixed image resolution. However, camera resolutions are increasing rapidly so that the assumed image resolution of the known object recognition algorithms may lie behind in its development. Additionally, even if object recognition algorithms would keep up with the availability of higher and higher resolution cameras, embodiments of the present invention recognize that the computing effort for a retraining of the existing neural networks and a reconfiguration of its hyper parameters would be enormous, which is regarded as key disadvantages of the traditional approaches. In order to overcome this sort of deadlock situation, embodiments of the present invention recognize a need to provide solid object recognition capability without the need for retraining the existing image recognition algorithms.

In the context of this description, the following conventions, terms and/or expressions may be used.

The term 'object detection' may denote the activity of a system supported by a method for identifying one or more predefined items, samples or patterns in a given digital image.

The term 'high-resolution image' may denote an image having a resolution higher than a given algorithm used as input resolution for an object detection process of a typical image. Hence, the resolution of the input required for the baseline algorithm and the resolution of the high-resolution image do not match. Therefore, measures may be required to process the high-resolution image or at least parts thereof (e.g., image tiles), using already a pre-trained baseline algorithm without the requirement for a retraining or reconfiguration or re-design of the pre-trained baseline algorithm.

The term 'inference time' may denote the time in which a trained machine-learning system (e.g., a convolutional neural network), may predict a class or a segmentation of an input image. In contrast to the inference time is the training time. The upfront training of the machine-learning system may require a lot of computational power and time, whereas the inference activity of the trained machine-learning system may be optimized to work with only little computational resources.

The term 'decomposing an image' may denote a process of cutting a given digital image into portions (e.g., rectangular pieces), which may also be denoted as image tiles.

The term 'hierarchically organized layers' may denote a plurality of layers comprising a predefined number of sub-images of a given original (i.e., received) digital image in a given layer. Thereby, the layers may be differentiated by different resolutions. The lowest layer may be the one with the highest resolution, i.e., the maximum number of pixels available for the given digital image also provides a basis for global coordinates. The highest layer may be defined as the one having the lowest number of pixels for the given digital image, i.e., the one with the lowest resolution.

The term 'resolution suitable' (e.g., in particular a resolution suitable for the baseline algorithm) may denote the resolution of a digital image optimized for an object recognition algorithm like mask R-CNN or fast R-CNN. For example, the algorithms work with a resolution of 224×224 pixels. Hence, a digital image having 1000×1000 pixels is not suitable for the given baseline algorithm.

The term 'trained baseline image recognition algorithm' may denote an image detection and/or recognition algorithm, also implementable completely in hardware (e.g., using cross bars of memristive devices), which has undergone a training such that hyper parameters and weighing factors (e.g., of the convolutional neural network) may be defined and a neural network model is developed accordingly. The trained baseline algorithm may then be used for object recognition tasks at interference time.

The term 'smart results aggregation' may denote a multi-step process instrumental for the here proposed object recognition process. Smart results aggregation may comprise at least the steps of (i) aggregating results of the baseline algorithm per layer, (ii) performing a pairwise layer comparison, and (iii) performing a hierarchical aggregation of the comparison results. Details of the multi-step process are defined by the dependent claims and described in more detail in the context of the Figures.

The term 'overlapping area' may denote a portion of tiles of an image that can be part of two adjacent image tiles of the same digital image. The image portion may be part of the left image tile and a right image tile lying side-by-side.

The term 'intermediate image layer' may denote a layer being built by a layer-wise comparison of intermediate results as part of the smart results aggregation process. Hence, a given number of M layers (e.g., 4 layers) results in N intermediate image layers, wherein N=M−1. A practical example is described in further detail with regard to FIG. 4.

The term 'pixel-wise union' may denote a process of combining two shapes with a logical "OR" function. The "OR" function may be applied to binary masks that encode the shape. Similarly, the same term may denote a process of taking the "UNION" of two shapes that might be encoded as polygons.

The term 'pixel-wise intersection' may denote a process of combining two shapes with a logical "AND" function. The "AND" function may be applied to binary masks that encode the shape. Similarly, the same term may denote a process of taking the "INTERSECTION" of two shapes that might be encoded as polygons.

The term 'recognized item' may denote an object in a digital image with a predefined shape (i.e., a shape or other characteristic features) to which recognition or identification the used machine-learning system has been trained. In this sense, the recognized item may be identical to the recognized object.

The term 'mask R-CNN algorithm' may denote the known convolutional neural network algorithm used for instance segmentation based on known proceeding architectures for object detection. Thereby, an image input may be presented to the neural network; a Selected Search process may be run on the received digital image and then, the output regions from the Selected Search process may be used for future extractions and classification using a pre-trained convolutional neural network.

The term 'fast R-CNN algorithm' may denote an enhanced version of the mask R-CNN algorithm. A fast R-CNN algorithm may still use the Selected Search algorithm for obtaining region proposals, but may add a Region of Interest (ROI) pooling module. The 'fast R-CNN algorithm may extract fixed-size windows from the feature map for obtaining a final class label and a bounding box for a given object within the received digital image. A benefit of the approach may be in the fact that the convolutional neural network is now end-to-end trainable.

The term 'pre-trained' may denote that an image or object recognition system has been trained before use. In particular, the pre-trained object recognition system or method may be used as a tool for processing the digital images to be classified which are not directly suitable for the used previously trained baseline algorithm used (e.g., because of resolution mismatches). In contrast (e.g., on traditional systems), the here proposed concept uses a decomposition of the given (i.e., received) digital image together with a smart results aggregation in order to overcome the mismatch of the resolution of the received digital image and the resolution required by the baseline object recognition algorithm.

The term 'neural network model' may denote the sum of all weights of a given neural network together with the used logical organization of the neural network (i.e., the hyper parameters of underlying machine-learning system, here, a convolutional neural network).

In the following, a detailed description of the Figures will be given. All instructions in the figures are schematic. Firstly, a block diagram of an embodiment of the inventive method for improving object detection in high-resolution images at inference time is given. Afterwards, further embodiments, as well as embodiments of the object recognition system for improving object detection in high-resolution images at inference time, will be described.

FIG. 1 shows a block diagram of an embodiment of the method 100 for improving object detection (e.g., defect detection) in high-resolution images at inference time, in accordance with an embodiment of the present invention. In example embodiments, object recognition system 600 (depicted in FIG. 6) can perform processing steps of method 100 (i.e., execute FIG. 1), in accordance with embodiments of the present invention. In additional example aspects, object recognition system 600 (in combination with method 100) can perform operations depicted and described in further detail with regard to FIGS. 2-5, in accordance with various embodiments of the present invention.

In step 102, method 100 receives a high-resolution image. In example embodiments, method 100 receives a digital image with a resolution larger than the image resolution used by the underlying baseline image recognition algorithm (e.g., mask R-CNN).

In step 104, method decomposes the received image into hierarchically organized layers of images. In example embodiments, each layer comprises at least one image tile of the received image (only the image with f=max has only one, all other layers have more tiles). In additional embodiments, each of the image tiles have a resolution suitable (e.g., required or recommended) to a pre-trained baseline image recognition algorithm.

In step 106, method 100 applies the baseline algorithm to each of the image tiles of each layer. In example embodiments, method 100 can operate to identify regions of interest, bounding boxes of objects (i.e., a rectangle encircling the defect and classification), and/or alternatively, additionally mask, polygons, shapes, based on the pre-training.

Additionally, in process 108, method 100 performs a smart result aggregation. For example, method 100 performs a smart result aggregation of results of the baseline algorithm applications to the image tiles of the layers utilizing a three-step approach, as described in steps 110-114.

In step 110, method 100 aggregates results of the baseline algorithm per layer. In step 112, method 100 performs a pairwise layer comparison of results of the baseline algorithm to adjacent pairwise layers. In step 114, method 100 performs a hierarchical aggregation of the baseline algorithm results depending on the pairwise layer comparison. Thereby, method 100 can utilize a consistent scaling factor may be used meaning that, depending on the resolution, one pixel in one resolution may be compared to four pixels in another resolution and/or 16 pixels and even higher resolutions. If in a higher than the lowest resolution (e.g., in a black and white image or in one or multiple color channels) the number of pixels being white or black are equally distributed (i.e., 50/50), a random decision for one of the two color options is performed.

Figure 2:
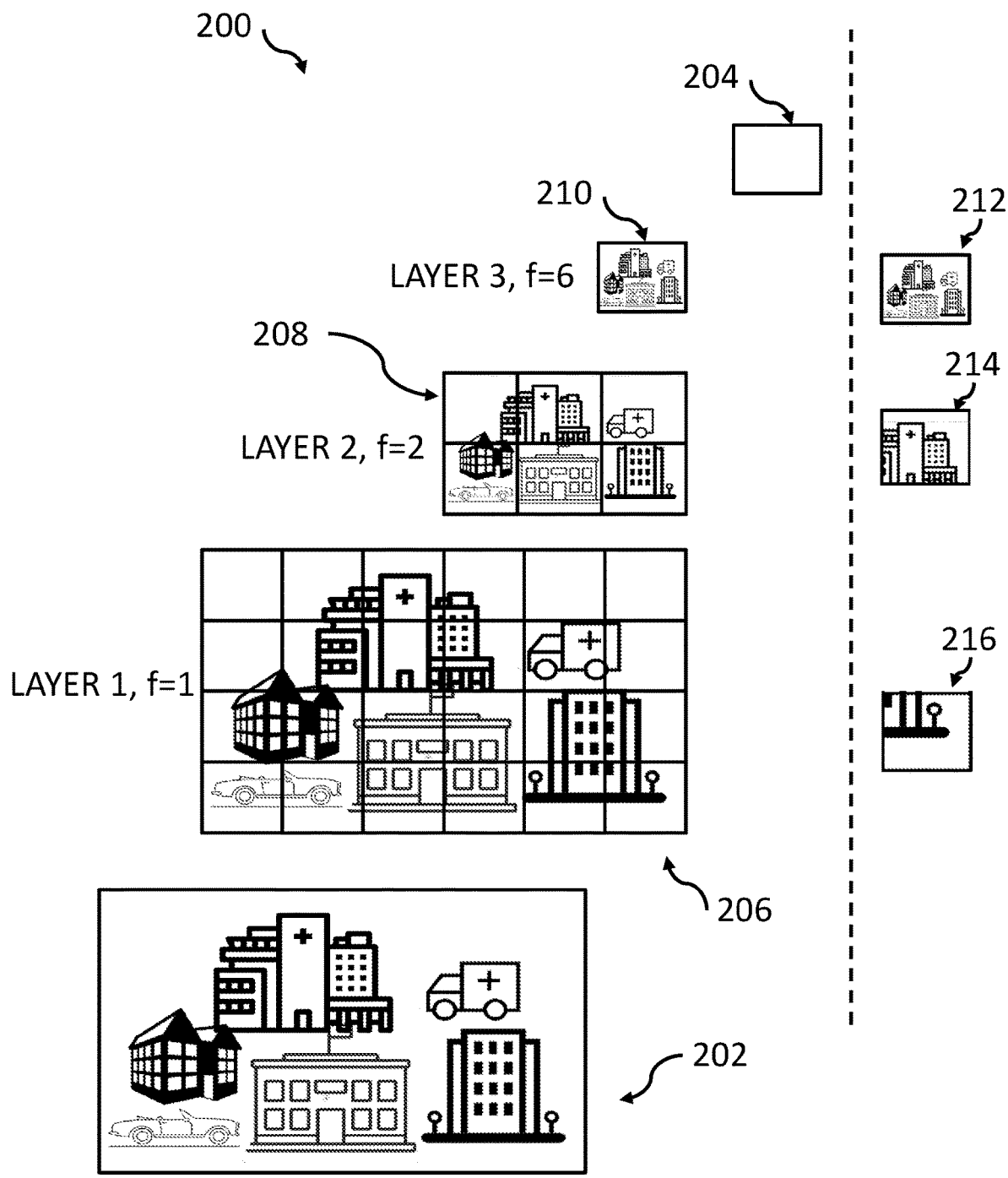
FIG. 2 depicts a block diagram of an embodiment in which an original high-resolution image is used as basis for the described processing, in accordance with an embodiment of the present invention.

FIG. 2 depicts a block diagram 200 of an embodiment in which an original, received high resolution image 202 is used as basis for the operations of embodiments of the present invention (e.g., processes of method 100). The rectangle 204 represents the fixed working size of working resolution used and/or required by the baseline image recognition algorithm. Thus, the images of the different layers, in particular layer 1, layer 2, layer 3, corresponding to f=1.0, f=2.0, f=6.0, respectively, have to be cut in tiles. The first layer image 206 is cut in 24 tiles, such that each tile has the number of pixels equal to the working size of the image of the baseline algorithm.

Correspondingly, the image 208 of layer 2, having a lower resolution than the image of layer 1, requires only 6 tiles, while the image 210 with the lowest resolution (layer 3) only requires a single tile, because the corresponding resolution is matching the working size of the baseline algorithm. The number of layers is configurable and may depend on the image resolution of the received digital image.

As a result of the tiling step, embodiments of the present invention generate sets of tiles 212, tiles 214, and tiles 216, where the number of tiles per set increases the higher the resolution of the image 206, image 208, and image 210. The sets of image tiles are then used as input to the baseline algorithm. As an example, tile 216 is the lower right corner of image 206 and image tile 214 is the upper middle portion of the layer 2 image 208. The whole process is described in further detail with regard to FIG. 3.

Figure 3:
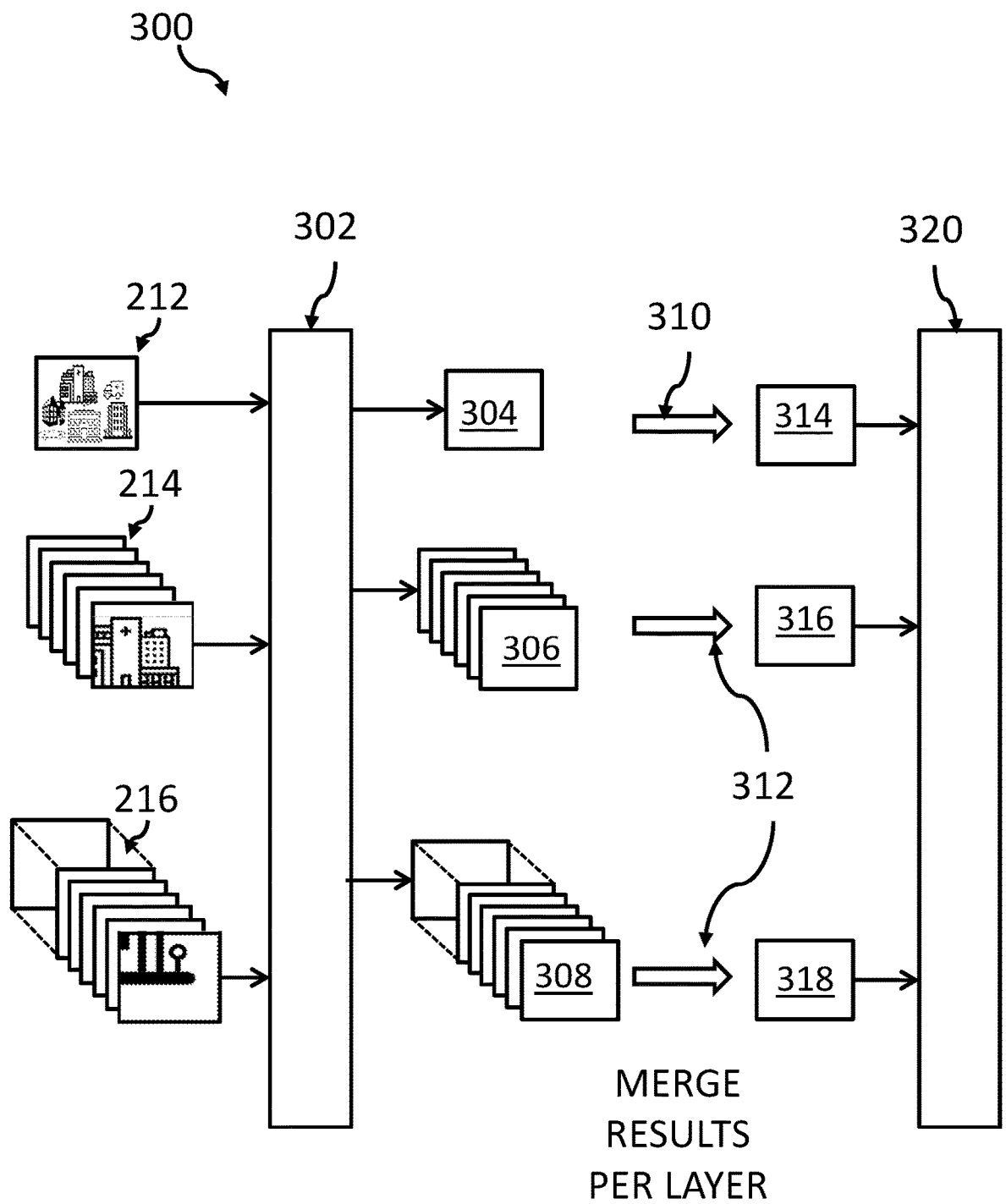
FIG. 3 depicts a block diagram detailing the feeding of the sets of input tiles to the object recognition baseline algorithm, in accordance with an embodiment of the present invention.

FIG. 3 depicts a block diagram 300, detailing the feeding of the sets input tiles 212, tiles 214, and tiles 216 (f FIG. 2) to the object recognition baseline algorithm 302, in accordance with embodiments of the present invention. In various embodiments, object recognition baseline algorithm 302 can be used in a pre-trained form without the requirement of any additional training. For example, object recognition baseline algorithm 302 can be used as available. The sets of outputs 304, outputs 306, and outputs 308 of the baseline algorithm 302 can then merge per layer, which is symbolized by the arrow 310 and arrow 312. For the result set having the lowest resolution (304) an aggregation is not required.

Figure 4:
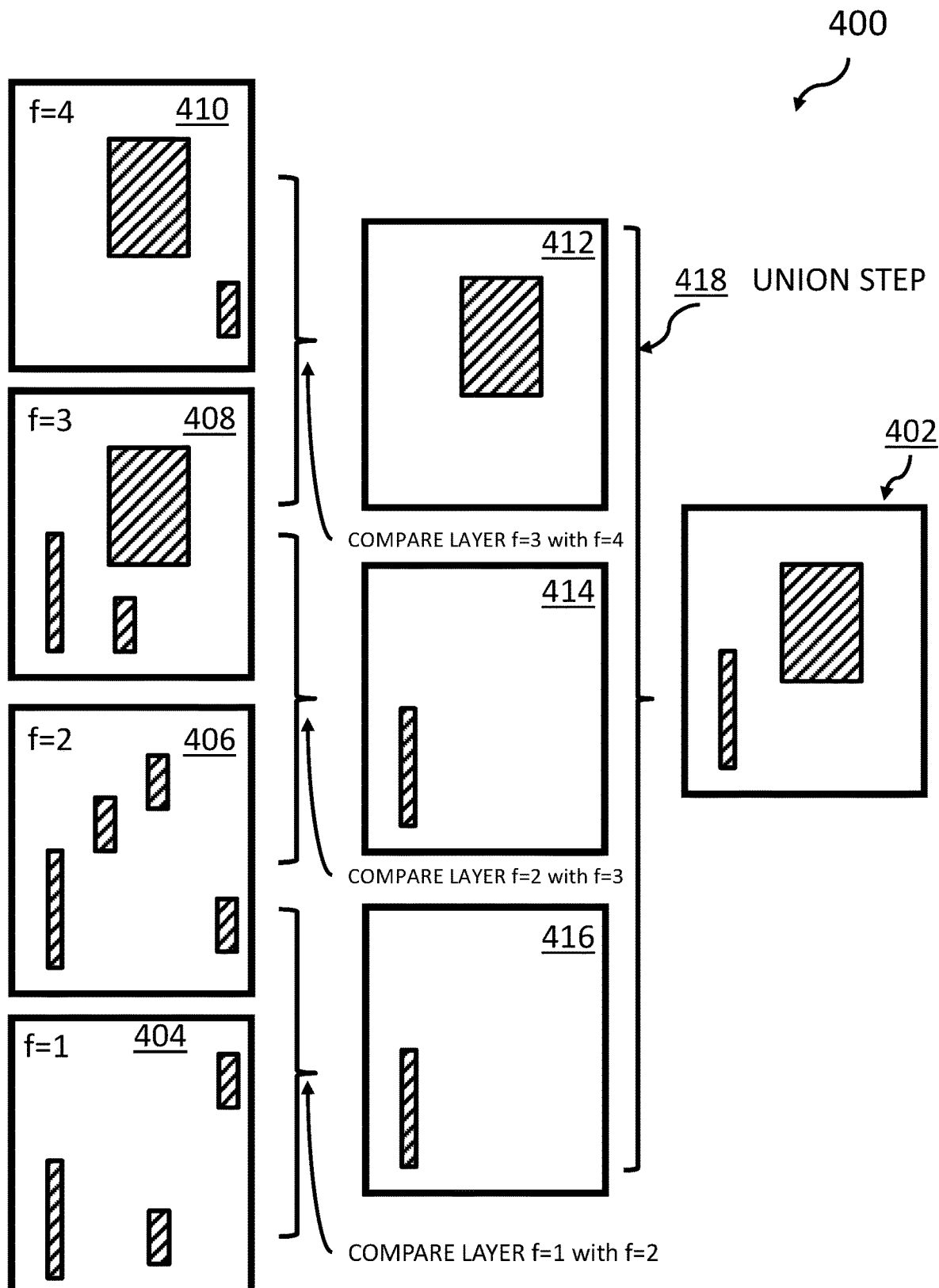
FIG. 4 depicts a block diagram detailing the steps of the pairwise layer comparison and the final union aggregation step to produce the final result, in accordance with an embodiment of the present invention.

Then, the layer results 314, layer results 316, and layer results 318 are input to the smart results aggregation step 320 in order to produce the final result of the object recognition process (described in further detail with regard to FIG. 4).

FIG. 4 depicts a block diagram 400 detailing the steps of the pairwise layer comparison and the final union aggregation step to produce the final result 402, in accordance with embodiments of the present invention. In the depicted example of the layer concept of FIG. 2, four different result sets 404, result sets 406, result sets 408, and result sets 410 (logically corresponding to the layer results 314, layer results 316, and layer results 318 of FIG. 3) are used as layer results. Adjacent instances (in the sense of the different resolution layers) are pairwise compared and an intersection (i.e., a logical "AND") is built in the intermediate layer data sets 412, 414, and 416, as depicted in FIG. 4. Embodiments of the present invention can then merge the intermediate data sets 412, 414, 416 in a logical "OR" operation 418 to build the final result 402 and to complete the smart results aggregation.

Also, as depicted in FIG. 4, the result set labeled f=4 (410) has the lowest resolution (corresponding to the highest layer) and the result set with f=1 (404) has the highest resolution and may represent also the reference for the global coordinates.

Figure 5:
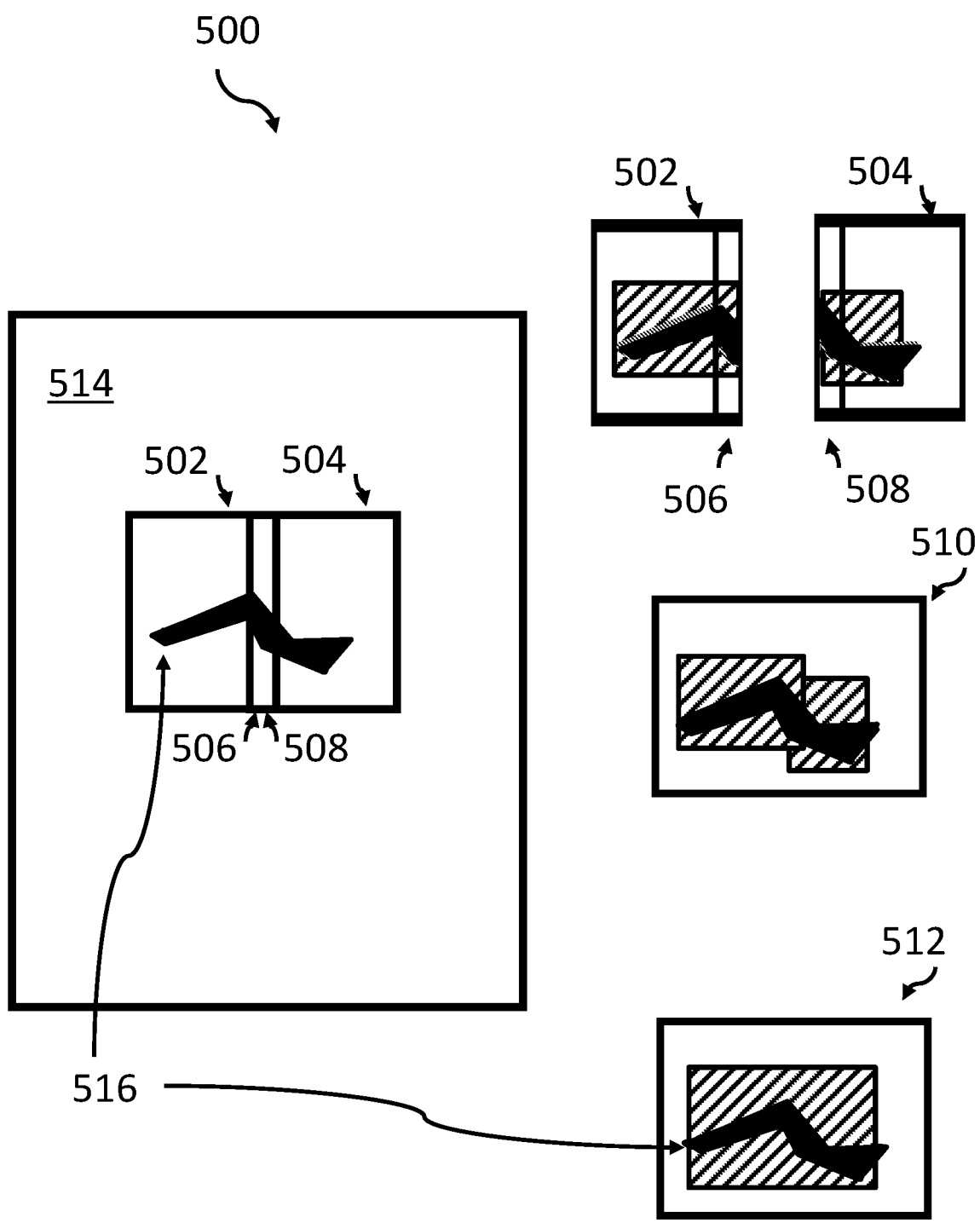
FIG. 5 depicts a diagram of the border region handling at edges of the tiles, in accordance with an embodiment of the present invention.

FIG. 5 depicts a diagram 500 of the border region handling edges of the tiles, in accordance with embodiments of the present invention. As depicted in FIG. 5, a tile 502 and another tile 504 both have corresponding border regions. The baseline of tile 502 and tile 504 provides independent results for the respective border/boundary areas 506 and 508 of the respective tiles 502 and 504. The merged tiles 502 and 504 in the form of rectangle 510 show the results in the global coordinates (i.e., in the coordinates of the original image having the highest resolution). Thereby, two separate partial detections are present in the result entity. As a result of the border region handling (symbolized as rectangle 512) the partial overlap is detected and the two partial results are unified into one detection result 516.

The large rectangle (surrounding original image 514) shows the corresponding process as part of, or better with global coordinates, of the formal high-definition/high-resolution (i.e., high resolution) image. As a result, the defect (i.e., the recognized object) is shown as a black scratch in a surface. The depiction of FIG. 5 can assume that the original image 514 was an image showing a surface of an element to be inspected visually.

The proposed method for improving object detection in high-resolution images at inference time may offer multiple advantages, technical effects, contributions and/or improvements. In various scenarios, high-resolution images may effectively and efficiently be fed to baseline object detection algorithms without the requirement to retrain the baseline algorithms that have been trained on much lower resolution images. However, because images of constantly growing resolutions (i.e., larger numbers of pixels per area) become available and, because the trained baseline algorithms are not adapted to deal with available resolutions (e.g., due to longer computing cycles during training and inference and thus more required computing power), special activities for producing results for digital images, having much higher resolutions, are proposed in various embodiments of the present invention.

Some embodiments of the present invention can be fully automated and only depends on a simple set up: e.g., number of hierarchical layers used, sensitivity threshold of the baseline model, and a predefined tile size (number of tiles per digital image). Already based on this, embodiments of the present invention can already work well using default parameters for the baseline algorithm. Various embodiments of the present invention also share the advantages of using deep learning techniques for defect detection, which may not require manual feature engineering and, in many cases, may outperform traditional machine-learning approaches with a large performance margin. Further embodiments of the present invention have also been verified using real-life data to a sort of defect detection task by using a mask R-CNN (Region Based Convolutional Neural Network) as the baseline algorithm.

In particular, the ability to reuse previously trained image recognition models that have used training images with low resolution as annotated training patterns may be a considerable advantage when real data have resolutions that correspond to 4K or 8K cameras. A retraining of the baseline algorithm is not required, such that embodiments of the present invention may be used during the inference phase. Hence, the high-resolution images and the respective object recognition may be treated with the baseline algorithms being originally designed for and trained using lower resolution images. Some embodiments of the present invention can also be adapted to high-resolution images of various resolutions by only setting a small set of configuration parameters.

In addition, embodiments of the present invention can also efficiently address the precision (also denoted as positive predicted value) and recall (also known as sensitivity of the algorithm) challenge of pattern recognition effectively in that the number of false-positive detections and the number of false-negative detections are minimized, respectively.

According to one advantageous embodiment of the present invention, the aggregation of the results of the baseline algorithm per layer (i.e., the first sub-step of the smart results aggregation) may also comprise extracting polygon encoding a shape of a recognized object, and mapping local polygon coordinates used for the image tiles to global coordinates used for the image tile having the highest resolution. Thereby, shapes of polygons of results of the baseline algorithm having a higher resolution are compacted, such that the compacted shapes are comparable to shapes in tiles having a lower resolution. In this context it may be noted that instead of coordinates of the highest resolution available also other scaling mechanisms (i.e., abstract coordinates may be used). Additionally, embodiments of the present invention can also operate to expand an image having a lower resolution to match an image with a high-resolution. For this, out of one pixel to our three or more pixels may be generated in the lower resolution image. The extraction of the polygon encoding of the shape of the recognized object may also be viewed as a much more precise image capturing technique instead of using only the smallest bounding or encircling rectangle of the recognized image.

According to another advantageous embodiment of the present invention, the aggregation of the results of the baseline algorithm per layer (an activity also relating to the first sub-step of the smart results aggregation) may also comprise eliminating overlapping areas between adjacent image tile borders of a respective layer, and merging a detected partial object of the adjacent tiles into one detected object. The border region handling may be advantageous in order to reconstruct seamless images. As a reminder: the overlaps have been created during the decomposition.

According to another embodiment of the present invention, the results of the baseline algorithm may comprise at least one selected out of the group consisting of a class of a recognized item or object, a bounding box surrounding an identified object in an image tile, and a mask represented by a polygon encircling a shape of the recognized object in the image tile. In particular, the recognized item or object may relate to a material defect or surface (e.g., a rebar corrosion, a crack, rust, spalling, and/or algae). Accordingly, embodiments of the present invention can advantageously be used for an inspection of infrastructure components like bridges, buildings, masts, pipes, pipelines and/or other industrial or infrastructure elements. Therefore, in an example embodiment, the object to be detected may be a material defect, in particular of an object to be examined.

According to another embodiment of the present invention, the baseline algorithm may be a mask R-CNN algorithm or fast R-CNN algorithm. Both algorithms are known for, and are often used, in the context of object detection. Thereby, an input image is presented to a neural network, a selective search is run on the image and then the output regions from the selective search are used for feature extraction a classification using a pre-trained convolutional neural network. Also, the fast R-CNN is based on a pre-trained convolutional neural network in which the last three classification layers have been replaced by new classification layers that are specific to the object classes required.

According to an additional embodiment of the present invention, the resolution suitable to a baseline image recognition algorithm may be selected out of the group 224×224 pixels, 512×512 pixels, 800×800 pixels, and 1024×800. Additionally, also other resolutions may be used. However, the baseline algorithms typically used normally work on a fixed resolution, (e.g., 224×224), which makes it difficult to compare and determine a relationship of images of different resolutions.

According to a further embodiment of the present invention, the baseline algorithm may be pre-trained such that a neural network model has been built for inference tasks for object recognition. The pre-training may typically be done when using the baseline algorithms mask R-CNN or fast R-CNN. Thus, the training which may have been performed on low resolution images or filters may, by virtue of the proposed concept, also be used for high resolution images.

Figure 6:
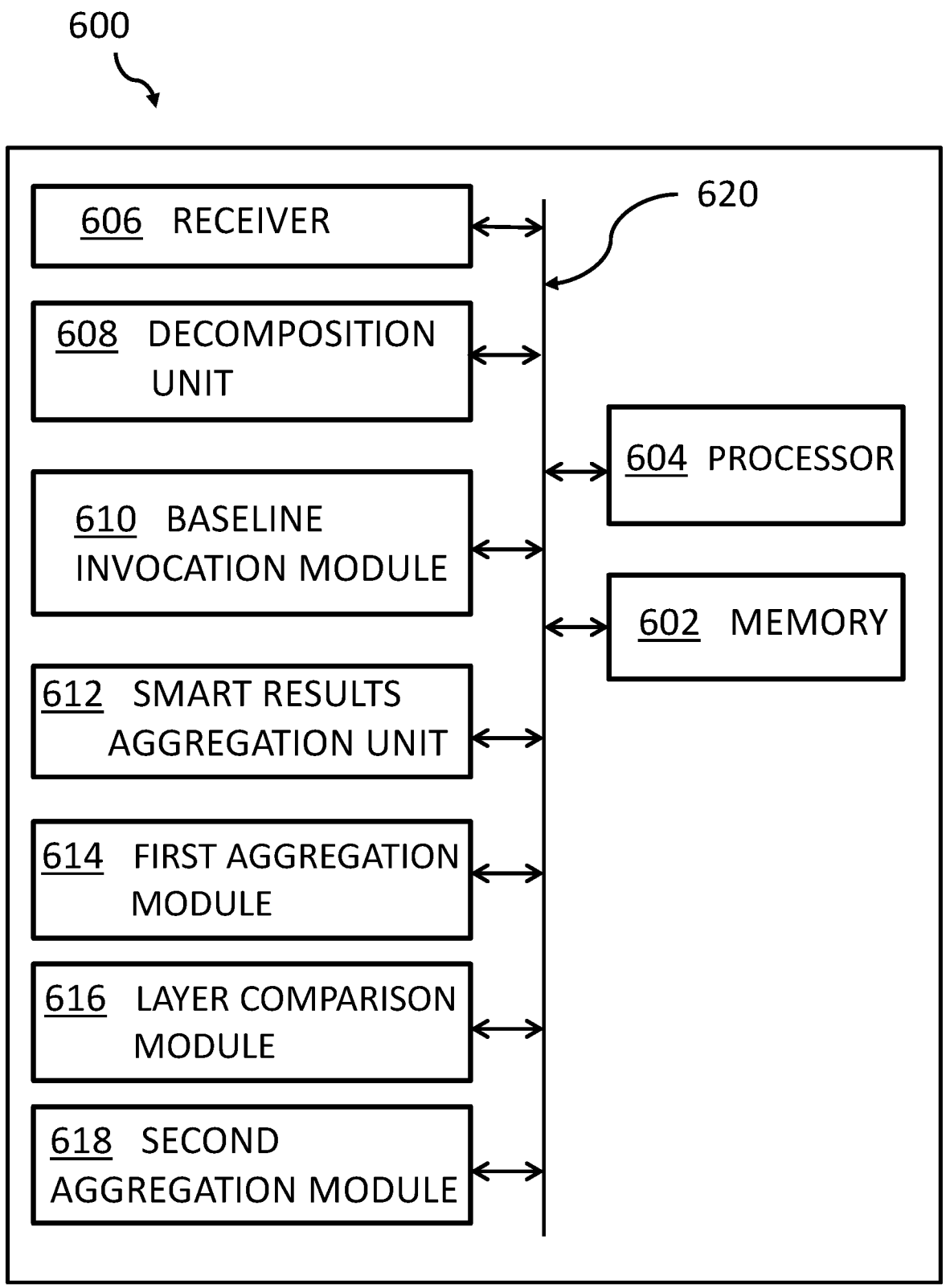
FIG. 6 depicts a block diagram of the object recognition system for improving object detection in high-resolution images at inference time, in accordance with an embodiment of the present invention.

For completeness reasons, FIG. 6 depicts a block diagram of the object recognition system 600 for improving object detection in high-resolution images at inference time. The object recognition system 600 comprises a processor 604 communicatively coupled to a memory 602 storing instruction for causing the system to perform the following: receive (in particular by a receiver 606) a high-resolution image; decompose (in particular by a decomposition unit 608) the received image into hierarchically organized layers of images. Thereby, each layer comprises at least one image tile of the received image and, each of the image tiles has a resolution suitable (or in particular required, recommended or efficient) to a baseline image recognition algorithm.

The instructions also comprise applying (in particular by the baseline invocation module 610) the baseline algorithm to each of the image tiles of each layer, and perform a smart results aggregation (in particular by a smart results aggregation unit) of results of the baseline algorithm applications to the image tiles of the layers. The particular function is be realized by a first aggregation module 614 adapted for aggregating results of the baseline algorithm per layer, a layer comparison module 616 adapted for performing a pairwise layer comparison of results of the baseline algorithm to adjacent pairwise layers, and a second aggregation module 618 adapted for performing a hierarchical aggregation of the baseline algorithm results depending on the pairwise layer comparison.

In addition, the modules and units (in particular the memory 602, the processor 604, the receiver 606, the decomposition unit 608, the baseline invocation module 610, the smart resides aggregation unit 612, the first aggregation module 614, the layer comparison module 616 and, the second aggregation module 618) may be in communicative contact to each other by direct connections or by means of a system internal bus system 620 data, signal and/or information exchange.

Figure 7:
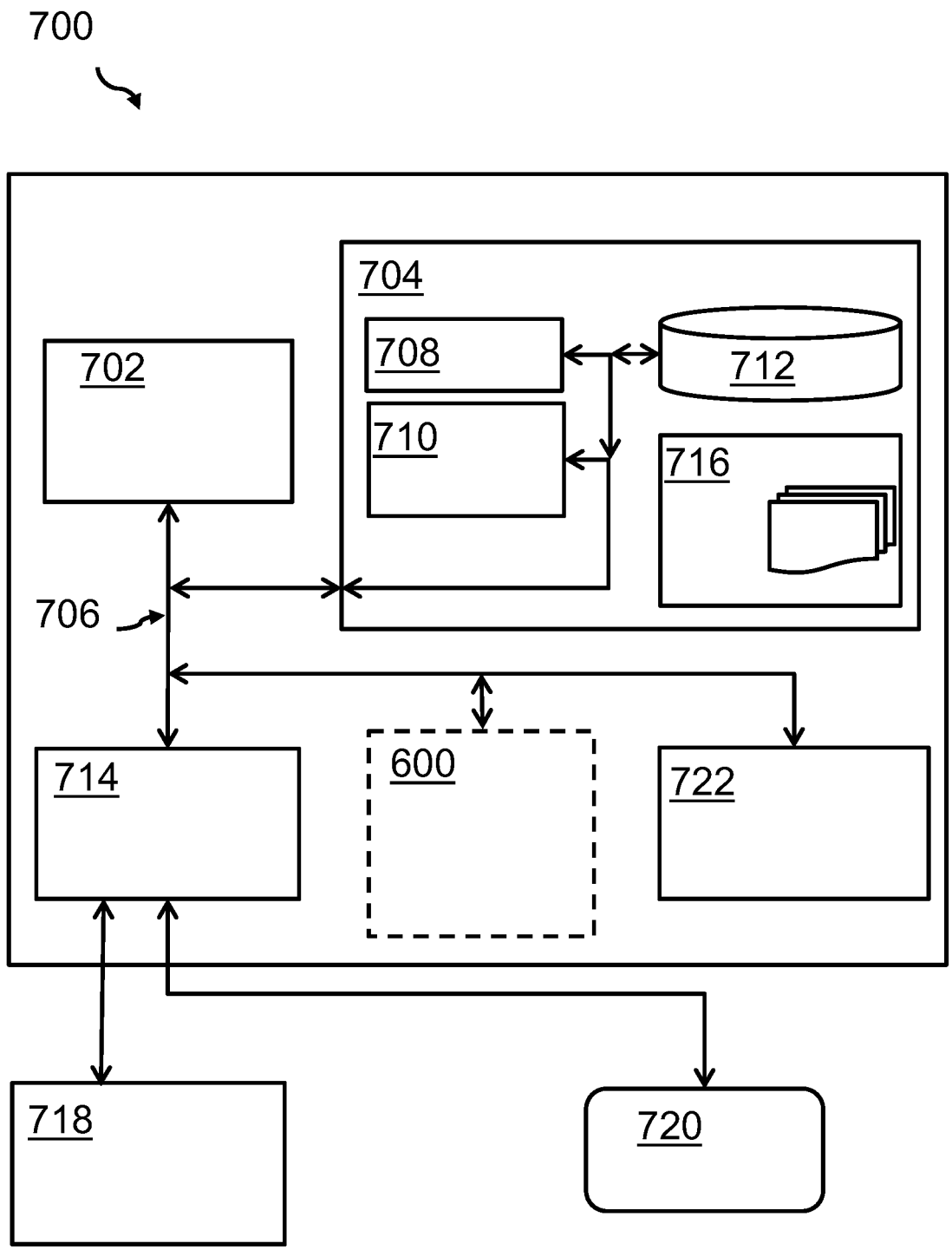
FIG. 7 depicts a block diagram of an embodiment of a computing system comprising the inventive object recognition system, in accordance with an embodiment of the present invention.

Embodiments of the invention may be implemented together with virtually any type of computer, regardless of the platform being suitable for storing and/or executing program code. FIG. 7 depicts, as an example, a computing system 700 suitable for executing program code related to the proposed method.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the FIG. 7, computer system/server 700 is shown in the form of a general-purpose computing device. The components of computer system/server 700 may include, but are not limited to, one or more processors or processing units 702, a system memory 704, and a bus 706 that couple various system components including system memory 704 to the processing units 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random-access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, object recognition system 600 for improving object detection in high-resolution images at inference time may be attached to a bus system (e.g., bus 706).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method comprising:
receiving, by one or more processors, a high-resolution image;
decomposing, by one or more processors, the received image into hierarchically organized layers of images, wherein each layer comprises at least one image tile of the received image, and wherein each of the image tiles have a corresponding resolution suitable to a baseline image recognition algorithm;

applying, by one or more processors, the baseline algorithm to each of the image tiles of each layer; and performing, by one or more processors, a result aggregation of results of the baseline algorithm applications to the image tiles of the layers, wherein performing the result aggregation of results of the baseline algorithm applications to the image tiles of the layers comprises:
aggregating, by one or more processors, results of the baseline algorithm per layer,
performing, by one or more processors, a pairwise layer comparison of results of the baseline algorithm to adjacent pairwise layers, and
performing, by one or more processors, a hierarchical aggregation of the baseline algorithm results depending on the pairwise layer comparison.

2. The method of claim 1, wherein performing the result aggregation of results of the baseline algorithm applications to the image tiles of the layers further comprises:
extracting, by one or more processors, polygon encoding a shape of a recognized object; and
mapping, by one or more processors, local polygon coordinates used for the image tiles to global coordinates used for the image tile having the highest corresponding resolution, thereby compacting shapes of polygons of results of the baseline algorithm having a higher resolution, such that the compacted shapes are comparable to shapes in tiles having a lower resolution.

3. The method of claim 2, further comprising:
eliminating, by one or more processors, overlapping areas between adjacent image tile borders of a respective layer; and
merging, by one or more processors, a detected partial object of the adjacent tiles into one detected object.

4. The method of claim 3, wherein performing a pairwise layer comparison further comprises:
comparing, by one or more processors, compacted relating shapes of image tiles of adjacent layers; and
building, by one or more processors, an intersection of shapes based on the comparison of the compacted relating shapes, thereby building N intermediate image layers, wherein N is by 1 smaller than said number of hierarchically organized layers.

5. The method of claim 4, wherein performing a hierarchical aggregation further comprises:
building, by one or more processors, a pixel-wise union of all N intermediate image layers, thereby building a final image of a resolution equivalent to the resolution of the received high-resolution image including a polygon encircling of the detected object.

6. The method of claim 1, wherein the results of the baseline algorithm comprise at least one selected out of the group consisting of a class of a recognized item, a bounding box surrounding an identified object in an image tile, and a mask represented by a polygon encircling a shape of the recognized object in the image tile.

7. The method of claim 1, wherein the baseline algorithm is a mask R-CNN (Region Based Convolutional Neural Network) algorithm or fast R-CNN algorithm.

8. The method of claim 1, wherein the resolution suitable to a baseline image recognition algorithm is selected out of the group consisting of 224×224 pixels, 512×512 pixel, 800×800 pixels, and 1024×800 pixels.

9. The method of claim 1, wherein the baseline algorithm is pre-trained such that a neural network model has been built for inference tasks for an object recognition.

10. The method of claim 1, wherein the object to be detected is a material defect.

11. A computer program product comprising:
one or more computer readable storage media and program instructions stored on the one or more computer readable storage media, the program instructions comprising:
program instructions to receive a high-resolution image;
program instructions to decompose the received image into hierarchically organized layers of images, wherein each layer comprises at least one image tile of the received image, and wherein each of the image tiles have a corresponding resolution suitable to a baseline image recognition algorithm;
program instructions to apply the baseline algorithm to each of the image tiles of each layer; and
program instructions to perform a result aggregation of results of the baseline algorithm applications to the image tiles of the layers, wherein the program instructions to perform the result aggregation of results of the baseline algorithm applications to the image tiles of the layers comprise program instructions to:
aggregate results of the baseline algorithm per layer,
perform a pairwise layer comparison of results of the baseline algorithm to adjacent pairwise layers, and
perform a hierarchical aggregation of the baseline algorithm results depending on the pairwise layer comparison.

12. The computer program product of claim 11, wherein the program instructions to perform the result aggregation of results of the baseline algorithm applications to the image tiles of the layers further comprise program instructions to:
extract polygon encoding a shape of a recognized object; and
map local polygon coordinates used for the image tiles to global coordinates used for the image tile having the highest corresponding resolution, thereby compacting shapes of polygons of results of the baseline algorithm having a higher resolution, such that the compacted shapes are comparable to shapes in tiles having a lower resolution.

13. The computer program product of claim 11, wherein the baseline algorithm is a mask R-CNN (Region Based Convolutional Neural Network) algorithm or fast R-CNN algorithm.

14. A computer system comprising:
one or more computer processors;
one or more computer readable storage media; and
program instructions stored on the computer readable storage media for execution by at least one of the one or more processors, the program instructions comprising:
program instructions to receive a high-resolution image;
program instructions to decompose the received image into hierarchically organized layers of images, wherein each layer comprises at least one image tile of the received image, and wherein each of the image tiles have a corresponding resolution suitable to a baseline image recognition algorithm;
program instructions to apply the baseline algorithm to each of the image tiles of each layer; and
program instructions to perform a result aggregation of results of the baseline algorithm applications to the image tiles of the layers, wherein the program instructions to perform the result aggregation of results of the baseline algorithm applications to the image tiles of the layers comprise program instructions to:
aggregate results of the baseline algorithm per layer, perform a pairwise layer comparison of results of the baseline algorithm to adjacent pairwise layers, and perform a hierarchical aggregation of the baseline algorithm results depending on the pairwise layer comparison.

15. The computer system of claim 14, wherein the program instructions to perform the result aggregation of results of the baseline algorithm applications to the image tiles of the layers further comprise program instructions to:

extract polygon encoding a shape of a recognized object; and map local polygon coordinates used for the image tiles to global coordinates used for the image tile having the highest corresponding resolution, thereby compacting shapes of polygons of results of the baseline algorithm having a higher resolution, such that the compacted shapes are comparable to shapes in tiles having a lower resolution.

16. The computer system of claim 14, wherein the baseline algorithm is a mask R-CNN (Region Based Convolutional Neural Network) algorithm or fast R-CNN algorithm.

17. The computer system of claim 14, wherein the object to be detected is a material defect.

* * * * *